(12) United States Patent
Gerovac et al.

(10) Patent No.: US 8,887,166 B2
(45) Date of Patent: Nov. 11, 2014

(54) RESOURCE ALLOCATION AND MODIFICATION USING ACCESS PATTERNS

(75) Inventors: Branko J. Gerovac, Lexington, MA (US); David C. Carver, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1561 days.

(21) Appl. No.: 12/170,732

(22) Filed: Jul. 10, 2008

(65) Prior Publication Data

US 2010/0011365 A1 Jan. 14, 2010

(51) Int. Cl.
| | | |
|---|---|---|
| G06F 9/30 | (2006.01) | |
| H04L 29/08 | (2006.01) | |
| H04L 12/923 | (2013.01) | |
| G06F 9/50 | (2006.01) | |
| H04L 12/911 | (2013.01) | |

(52) U.S. Cl.
CPC .............. *G06F 9/5083* (2013.01); *H04L 67/32* (2013.01); *H04L 47/762* (2013.01); *H04L 47/828* (2013.01); *H04L 47/781* (2013.01)
USPC ........... 718/104; 709/226; 709/216; 711/150; 711/170

(58) Field of Classification Search
None
See application file for complete search history.

(56) References Cited

U.S. PATENT DOCUMENTS

| | | |
|---|---|---|
| 3,746,780 A | 7/1973 | Stetten et al. |
| 3,851,104 A | 11/1974 | Willard et al. |
| 4,845,658 A | 7/1989 | Gifford |
| 5,132,992 A | 7/1992 | Yurt et al. |
| 5,581,552 A | 12/1996 | Civanlar et al. |
| 5,581,784 A | 12/1996 | Tobagi et al. |
| 5,583,995 A | 12/1996 | Gardner et al. |
| 5,608,448 A | 3/1997 | Smoral et al. |
| 5,640,563 A | 6/1997 | Carmon |
| 5,787,482 A | 7/1998 | Chen et al. |
| 5,805,804 A | 9/1998 | Laursen et al. |
| 5,862,312 A | 1/1999 | Mann et al. |
| 5,926,649 A | 7/1999 | Ma et al. |

(Continued)

FOREIGN PATENT DOCUMENTS

| | | |
|---|---|---|
| WO | WO 2008/137334 | 11/2008 |
| WO | WO 2010/006127 | 1/2010 |
| WO | WO 2010/006132 | 1/2010 |
| WO | WO 2010/006134 | 1/2010 |

OTHER PUBLICATIONS

Ruemmler, et al., "An introduction to disk drive modeling." IEEE Computer Magazine, 27(3), pp. 17-29, Mar. 1994.

(Continued)

*Primary Examiner* — William B Partridge
(74) *Attorney, Agent, or Firm* — Harrity & Harrity, LLP

(57) ABSTRACT

A computer-implemented method includes obtaining information characterizing a level of actual usage of a first item of content; based on the obtained information, determining whether a re-provisioning condition is satisfied and if so, generating a specification of a re-provisioning operation to be executed in association with the resources of a storage environment; and executing the re-provisioning operation. The first item of content is stored on a first set of elements of resources of the storage environment according to a first resource allocation arrangement. The re-provisioning operation includes identifying a second resource allocation arrangement for storing the first item of content; and allocating a second set of elements of the resources of the storage environment according to the second resource allocation arrangement.

28 Claims, 9 Drawing Sheets

(56) References Cited

U.S. PATENT DOCUMENTS

| | | | |
|---|---|---|---|
| 6,230,200 B1 | 5/2001 | Forecast et al. | |
| 6,374,336 B1 | 4/2002 | Peters et al. | |
| 6,401,126 B1 | 6/2002 | Douceur et al. | |
| 6,609,149 B1 | 8/2003 | Bandera et al. | |
| 7,058,947 B1 | 6/2006 | Raja et al. | |
| 7,277,978 B2 | 10/2007 | Khatami et al. | |
| 8,191,070 B2 | 5/2012 | Gerovac et al. | |
| 2003/0005457 A1 | 1/2003 | Faibish et al. | |
| 2003/0140051 A1 | 7/2003 | Fujiwara et al. | |
| 2003/0195948 A1 | 10/2003 | Takao et al. | |
| 2004/0103437 A1 | 5/2004 | Allegrezza et al. | |
| 2004/0198386 A1 | 10/2004 | Dupray | |
| 2005/0181803 A1 | 8/2005 | Weaver et al. | |
| 2005/0262246 A1* | 11/2005 | Menon et al. | 709/226 |
| 2006/0062555 A1 | 3/2006 | Zimmermann et al. | |
| 2006/0087990 A1 | 4/2006 | Kakivaya et al. | |
| 2006/0190552 A1 | 8/2006 | Henze et al. | |
| 2006/0259662 A1 | 11/2006 | Furukawa et al. | |
| 2006/0272015 A1 | 11/2006 | Frank et al. | |
| 2008/0109580 A1 | 5/2008 | Carlson et al. | |
| 2008/0244033 A1 | 10/2008 | Hook et al. | |
| 2008/0273540 A1 | 11/2008 | Gerovac et al. | |
| 2010/0010999 A1 | 1/2010 | Gerovac et al. | |
| 2010/0011002 A1 | 1/2010 | Gerovac et al. | |
| 2010/0011003 A1 | 1/2010 | Carver et al. | |
| 2010/0011091 A1 | 1/2010 | Carver et al. | |
| 2010/0011096 A1 | 1/2010 | Gerovac et al. | |
| 2010/0011145 A1 | 1/2010 | Carver et al. | |
| 2010/0011364 A1 | 1/2010 | Gerovac et al. | |
| 2012/0259977 A1 | 10/2012 | Gerovac et al. | |

OTHER PUBLICATIONS

Teorey, et al., "A Comparative Analysis of Disk Scheduling Policies", Communications of the ACM, v.15 n.3, pp. 177-184, Mar. 1972.

Oney, "Queueing Analysis of the Scan Policy for Moving-Head Disks", Journal of the Association for Computing Machinery, vol. 22, No. 3, Jul. 1975, pp. 397-412.

Reddy, et al., Issues in a multimedia system, IEEE Computer Magazine 27, 3, pp. 69-74, Mar. 1994.

Shenoy, et al., "Cello: A Disk Scheduling Framework for Next Generation Operating Systems", Real-Time Syst. 22, 1-2, 9-48, Jan. 2002.

Shahabi, et al., "Yima: A Second-Generation Continuous Media Server", IEEE Computer Magazine, pp. 56-64, Jun. 2002.

Hartman, et al., "The Zebra Striped Network File System", ACM Transactions on Computer Systems, vol. 13, No. 3, pp. 274-310, Aug. 1995.

Long, et al., "Swift/RAID: A Distributed RAID System", Computer Systems, vol. 7, No. 3, pp. 333-359, Jun. 1994.

Chen, et al., RAID: High-Performance, Reliable Secondary Storage, ACM Computer Survey vol. 26, No. 2, pp. 145-185, Jun. 1994.

Stonebraker, et al., "Distributed RAID—A New Multiple Copy Algorithm", Proceedings of the Sixth International Conference on Data Engineering, IEEE Computer Society, pp. 430-437, Feb. 1990.

Liu, et al., "Scheduling Algorithms for Multiprogramming in a Hard-Real-Time Environment", J. ACM, vol. 20, No. 1, pp. 46-61, Jan. 1973.

Sha, et al., "A Systematic Approach to Designing Distributed Real-Time Systems", IEEE Computer Magazine, vol. 26, No. 9, pp. 68-78, Sep. 1993.

Thouin, et al., "Video-on-Demand Networks: Design Approaches and Future Challenges", IEEE Network, Special Issue, vol. 21, No. 2, pp. 42-48, Mar. 2007.

Stoller, et al., "Storage Replication and Layout in Video-on-Demand Servers", Proceedings of the 5th International Workshop on Network and Operating System Support for Digital Audio and Video, Apr. 19-21, 1995.

Tetzlaff, et al., "Elements of scalable video servers", Proceedings of the 40th IEEE Computer Society International Conference, pp. 239-248, Mar. 1995.

Wong, et al., "Strategic Selection and Replication of Movies by Trend-Calibrated Movie-Demand Model", Proceedings of the 2000 international Conference on Microelectronic Systems Education, IEEE Computer Society, pp. 97-100, Nov. 2000.

Little, et al., "Popularity-Based Assignment of Movies to Storage Devices in a Video-on-Demand System", Multimedia Systems, vol. 2, No. 6, pp. 280-287, Jan. 1995.

Griwodz, et al., "Long-term Movie Popularity Models in Video-on-Demand Systems", Proceedings of the 5th ACM International Conference on Multimedia, pp. 349-357, Nov. 1997.

Androutsellis-Theotokis et al; "A Survey of Peer-to-Peer Content Distribution Technologies;" AMC Computing Surveys, vol. 36, No. 4; Dec. 3004; pp. 335-371.

Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.

"NAND Flash Memories and Programming NAND Flash Memories Using ELNEC Device Programmers Application Note Version 2.01;" Sep. 2006, pp. 1-31.

Mourad; "Issues in the design of a storage server for video-on-demand;" Multimedia Systems; vol. 4, No. 2; Apr. 1, 1996; XP008040912; pp. 70-86.

Samsung Memory Division; NAND Flash ECC Algorithm 2568; Jun. 24, 2004; 8 sheets.

Samsung Memory Division; ECC Algorithm; 512B; Apr. 28, 2005; 8 sheets.

Samsung Memory Division; NAND Flash Spare Area Assignment Standard; Apr. 27, 2005; 5 sheets.

Venugopal et al.; "A Taxonomy of Data Grids for Distributed Data Sharing, Management, and Processing;" AMC Computing Surveys, vol. 38, Mar. 2006; Article 3, pp. 1-53.

PCT Search Report of the ISA for PCT/US2008/061401 dated Jul. 1, 2008.

PCT Search Report and Written Opinion of the ISA for PCT/US2009/050051 dated Sep. 7, 2009.

PCT Invitation to Pay Additional Fees dated Oct. 26, 2009 for PCT Pat. No. PCT/US2009/050057 filed on Jul. 9, 2009.

PCT International Preliminary Report of Patentability, date mailed Nov. 19, 2009, for PCT/US2008/061401.

U.S. Appl. No. 11/744,394, filed May 4, 2007.

Office Action dated May 7, 2010 from U.S. Appl. No. 12/170,769.

Restriction Requirement dated Jul. 9, 2010 from U.S. Appl. No. 12/170,787.

Restriction Requirement dated Jun. 10, 2010 from U.S. Appl. No. 12/170,624.

PCT Search Report of the ISA for PCT/US2009/050057 dated Jan. 14, 2010.

Written Opinion of the ISA for PCT/US2009/050057 dated Jan. 14, 2010.

Schindler, et al., "Automated disk drive characterization", Technical Report CMU-CS-99-176, Carnegie Mellon University, Nov. 1999, 21 pages.

Worthington, et al., "On-Line Extraction of SCSI Disk Drive Parameters" SIGMETRICS 95, Dec. 19, 1996, 46 pages.

Worthington, et al., "Scheduling for Modern Disk Drives and Non-Random Workloads", University of Michigan, Technical Report CSE-TR-194-94, Mar. 1, 1994, 51 pages.

Goel, et al., "SCADDAR: An Efficient Randomized Technique to Reorganize Continuous Media Blocks", 18th International Conference on Data Engineering (ICDE 2002), San Jose, California, Feb. 26-Mar. 1, 2002, 10 pages.

Schroeder, et al., "Disk failures in the real world: What does an MTTF of 1,000,000 hours mean to you?", Proceedings of the 5th USENIX Conference on File and Storage Technologies (FAST '07), pp. 1-16, Feb. 14, 2007.

Pinheiro, et al., "Failure Trends in a Large Disk Drive Population", Proceedings o the 5th USENIX Conference on File and Storage Technologies (FAST '07), pp. 17-28, May 4, 2007.

Liskov, et al., "Providing Persistent Objects in Distributed Systems", Proceedings of the 13th European Conference on Object-Oriented Programming, Jun. 14-18, 1999, 28 pages.

(56) References Cited

OTHER PUBLICATIONS

Liskov, et al., "Transactional File Systems Can Be Fast", Proceedings of the 11th Workshop on ACM SIGOPS European Workshop: Beyond the PC, Sep. 19-22, 2004, 6 pages.

Braam, "File Systems for Clusters from a Protocol Perspective", Second Extreme Linux Topics Workshop, Monterey, Jun. 1999, 5 pages.

Patterson, et al., "A Case for Redundant Arrays of Inexpensive Disks (RAID)" Proceedings of the 1988 ACM SIGMOD International Conference on Management of Data, ACM Press, Jun. 1988, 8 pages.

Ghandeharizadeh, et al., "Continuous Display of Video Objects Using Multi-Zone Disks", Univ. of Southern California, USC-CSE-94-592, Apr. 12, 1995, 28 pages.

Sinah, et al., "Intelligent Architectures for Managing Content", Communications Technology Magazine, May 1, 2003, 3 pages.

\* cited by examiner

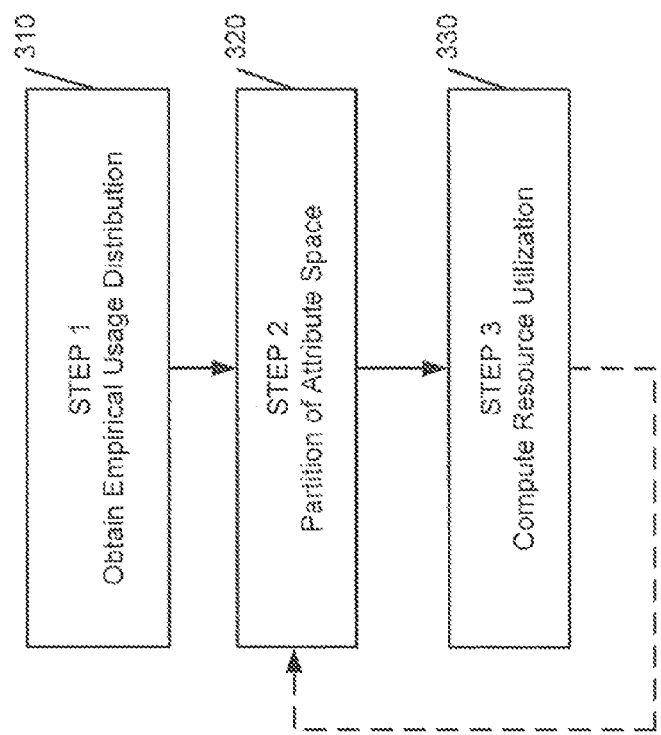

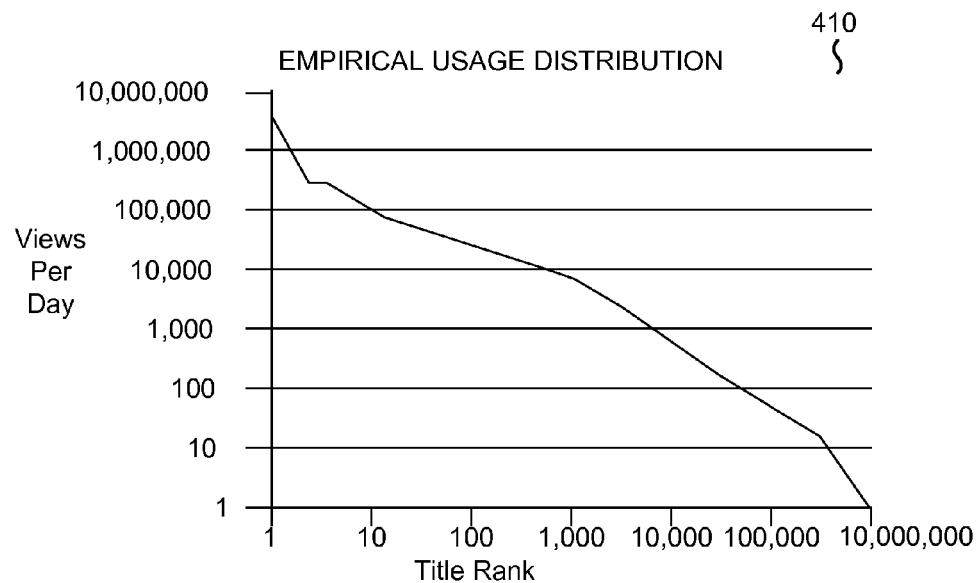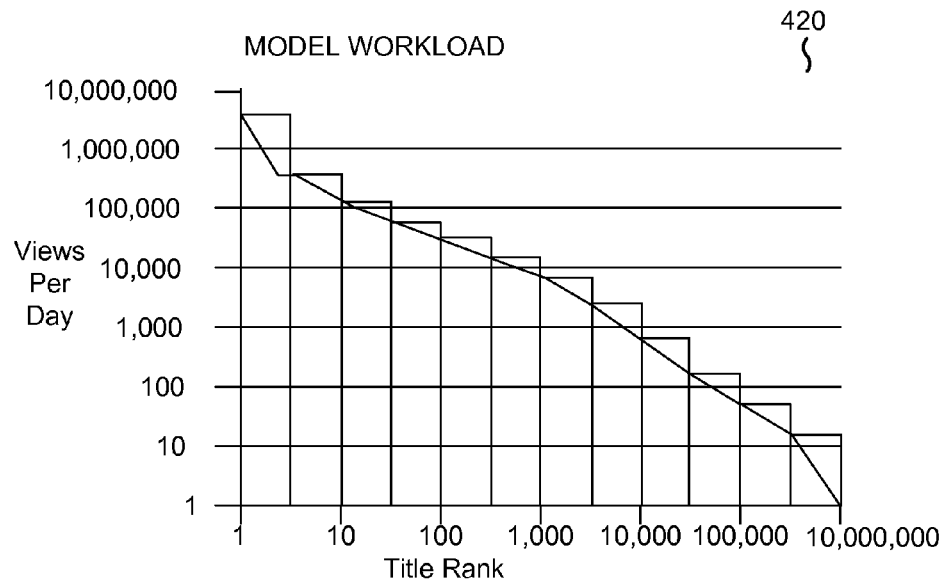
FIG. 4A

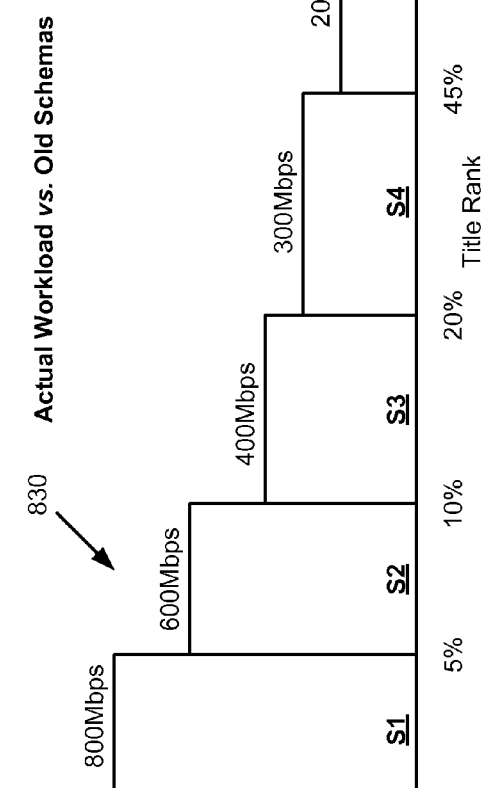
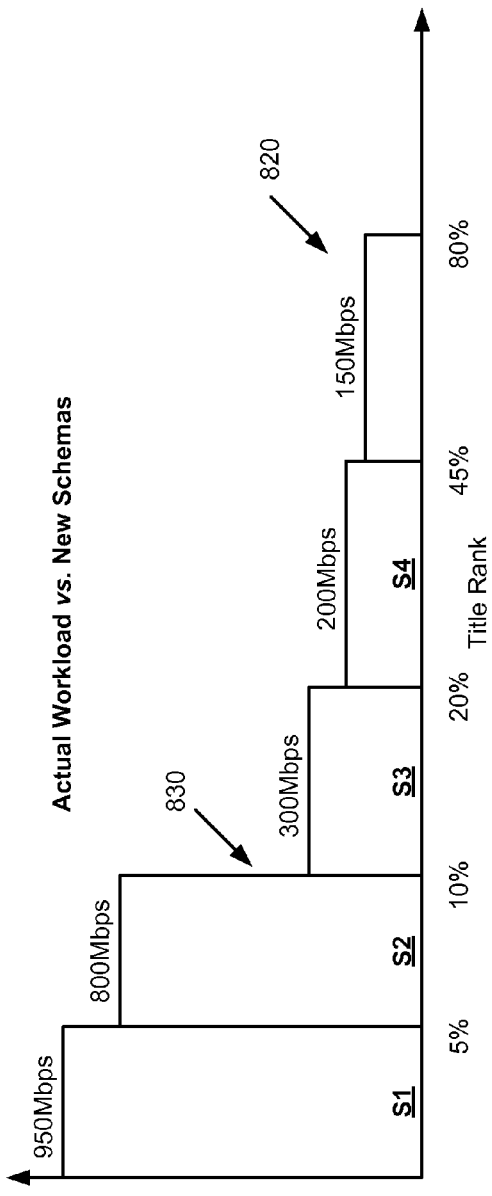
FIG. 8A
FIG. 8B

RESOURCE ALLOCATION AND MODIFICATION USING ACCESS PATTERNS

CROSS-REFERENCE TO RELATED APPLICATIONS

This application is related to U.S. patent application Ser. No. 12/170,646 titled "Model-based Resource Allocation," filed concurrently with the present application, and U.S. patent application Ser. No. 12/170,749 (now issued as U.S. Pat. No. 8,191,070, titled "Dynamic Resource Allocation," filed concurrently with the present application. The contents of the above applications are incorporated herein by reference.

BACKGROUND

This specification relates to resource allocation in a distributed system for data storage and access.

Distributed network-based data storage, for example accessible over the Internet, has various applications. One application is video storage and access.

During the past decade, online video streaming has gained increasing popularity among Internet users as high speed Internet service is now readily available for households. For example, while traditional video delivery systems (e.g., cable television systems) may no longer satisfy customers' growing demand for convenient access and instant delivery, movie consumers may soon turn to online video stores that can provide such service.

However, providing reliable download services to consumers on a large scale at an affordable cost presents many challenges. For example, configuring a network-based video storage and delivery system may encounter dynamic distributed real-time resource allocation issues that can be characterized as an NP complete problem. Conventional approaches for solving NP complete problems attempt to restrict the problem in some manners to conduct an exhaustive search for a deterministic solution. These procedures are often computationally expensive, yet may still produce undesirable results.

SUMMARY

In one aspect, in general, the invention features a computer-implemented method that includes obtaining information characterizing a level of actual usage of a first item of content; based on the obtained information, determining whether a re-provisioning condition is satisfied and if so, generating a specification of a re-provisioning operation to be executed in association with the resources of a storage environment; and executing the re-provisioning operation. The first item of content is stored on a first set of elements of resources of the storage environment according to a first resource allocation arrangement. The re-provisioning operation includes identifying a second resource allocation arrangement for storing the first item of content; and allocating a second set of elements of the resources of the storage environment according to the second resource allocation arrangement.

Aspect of the invention may include one or more of the following features.

The step of executing the re-provisioning operation may include storing one or multiple new instances of the first item of content on the second set of elements of resources according to the second resource allocation arrangement; and removing one or multiple previously-stored instances of the first item of content from the first set of elements of resources of the storage environment.

The re-provisioning operation may include a first type of anomaly-based re-provisioning operations. The computer-implemented method may further include detecting a discrepancy between the level of the actual usage of a first item of content and a provisioned level of usage, the provisioned level of usage being characterized by a first set of schema attributes associated with the first resource allocation arrangement; and comparing the discrepancy to an anomaly criterion to determine an occurrence of a provisioning anomaly. The anomaly criterion may include an anomaly threshold.

The computer-implemented method may further include, upon determining the occurrence of the provisioning anomaly, creating a provisioning anomaly object associated with the first item of content; maintaining the provisioning anomaly object in a list of outstanding re-provisions; and determining an anomaly-based re-provisioning operation to be executed in response to the provisioning anomaly object. The list of outstanding re-provisions includes a plurality of provisioning anomaly objects, each one of the plurality of provisioning anomaly objects being associated with a respective one of a plurality of anomaly-based re-provisioning operations. The computer-implemented method may further include prioritizing the plurality of anomaly-based re-provisioning operations based on a relative urgency of each one of the plurality of re-provisioning operations and an availability of the resources of the storage environment.

The anomaly-based re-provisioning operation may include identifying a second set of schema attributes that is representative of the level of actual usage of the first item of content. The second set of schema attributes is associated with the second resource allocation arrangement. The anomaly-based re-provisioning operation may further include: an up-provisioning operation to be executed when the level of actual usage of the first item of content exceeds the provisioned level of usage by a first predetermined threshold amount; and a down-provisioning operation to be executed when the provisioned level of usage of the first item of content exceeds the level of actual usage by a second predetermined threshold amount.

The obtained information may include one or more of the following: a number of concurrent access requests to the first item of content at a given time, an aggregate of access requests to the first item during a detection period, and a number and frequency of access requests being denied due to resource unavailability.

In another aspect, in general, the invention features a computer-implemented method that includes accepting a plan for managing resource allocation associated with a first item stored on resources of a storage environment, the plan including at least a first rule associated with a rule trigger; and applying the first rule upon activation of the rule trigger. The first rule associates an adjustment in resource allocation to the first item. The first item is characterized by an initial set of attributes, and is stored on resources of an storage environment according to one of a plurality of resource allocation arrangements that is compatible with the initial set of attributes.

Aspect of the invention may include one or more of the following features.

The plurality of resource allocation arrangements may be maintained in a first database.

The first rule includes a specification of an adjustment applicable to the initial set of attributes characterizing the first item, and the method of applying the first rule includes computing an adjusted set of attributes of the first item according to the specification of the adjustment; selecting one from the plurality of resource allocation arrangements that is compatible with the adjusted set of attributes of the first item; and allocating resources to store one or multiple instances of the first item based on the selected one of the plurality of resource allocation arrangements. The adjustment applicable to the initial set of attributes includes applying a discount factor to a present value of at least one of the initial set of attributes. The first rule may include a description of sequentially selecting one from a list of candidate resource allocation arrangements for the first item.

The rule trigger is defined in part by an onset point followed by an activation window. The onset point and the activation window may be determined based in part on an assessment of a trend of a pattern of access to the first item with respect to time. The rule trigger may be defined by a sequence of onset points. Each one of the sequence of onset points is followed by a respective activation window. The method of applying the first rule may include iteratively applying the first rule to the first item upon occurrence of each one of the sequence of onset points.

The first item may be characterized by a respective initial set of attributes, and is stored on resources of the storage environment according to a respective one of a plurality of resource allocation arrangements.

The method of applying the first rule may include applying the first rule to each one of a group of items according to a predetermined order. The first rule may include a plurality of components, each component being specific to a different item of a group of items. The predetermined order is specified in the plan. The plan may further include a plurality of rules, each rule associated with a respective rule trigger.

The computer-implemented method may further include modifying the plan for manage resource allocation in response to a change in an operating condition of the storage environment. The operating condition of the storage environment may include a hardware configuration of the resources of the storage environment. The operating condition of the storage environment may also include a pattern of access to one or multiple items of the group of items stored on resources of the storage environment.

Other general aspects include other combinations of the aspects and features described above and other aspects and features expressed as methods, apparatus, systems, computer program products, and in other ways.

Other features and advantages of the invention are apparent from the following description, and from the claims.

BRIEF DESCRIPTION OF DRAWINGS

FIG. 3 is a flow diagram illustrating an exemplary approach for attribute-based modeling.

FIGS. 4A and 4B illustrate one example of modeling using a single attribute.

FIGS. 8A and 8B illustrate one example of re-modeling.

DETAILED DESCRIPTION

1 System Overview

In a distributed system, there can be a library of content characterized by a broad range of attributes (e.g., data type, length, popularity and access patterns) and operational objectives (e.g., performance, integrity, and resilience), such that each piece of content may involve the use of system resources on different levels. For example, content of higher popularity may generally need more access resources (e.g., readout bandwidth) in to enhance their streaming performance; while content of greater importance, on the other hand, may need more storage space (e.g., to store redundancy data) to ensure data integrity.

Managing a finite amount of system resources in a way that can well serve the operational objectives of content usage can be a complex problem. Moreover, the level of difficulty can grow progressively as the system increases in size. In some systems, it is advantageous to apply domain-specific knowledge in managing system resources across multiple dimensions (such as storage and access resources). This approach will be illustrated in the context of a distributed system for data storage and access, which is described in U.S. patent application Ser. No. 12/170,657 (now issued as U.S. Pat. No. 8,099,402, titled "Distributed Data Storage and Access Systems," filed concurrently with the present application, the disclosure of which is incorporated herein by reference.

Figure 1:
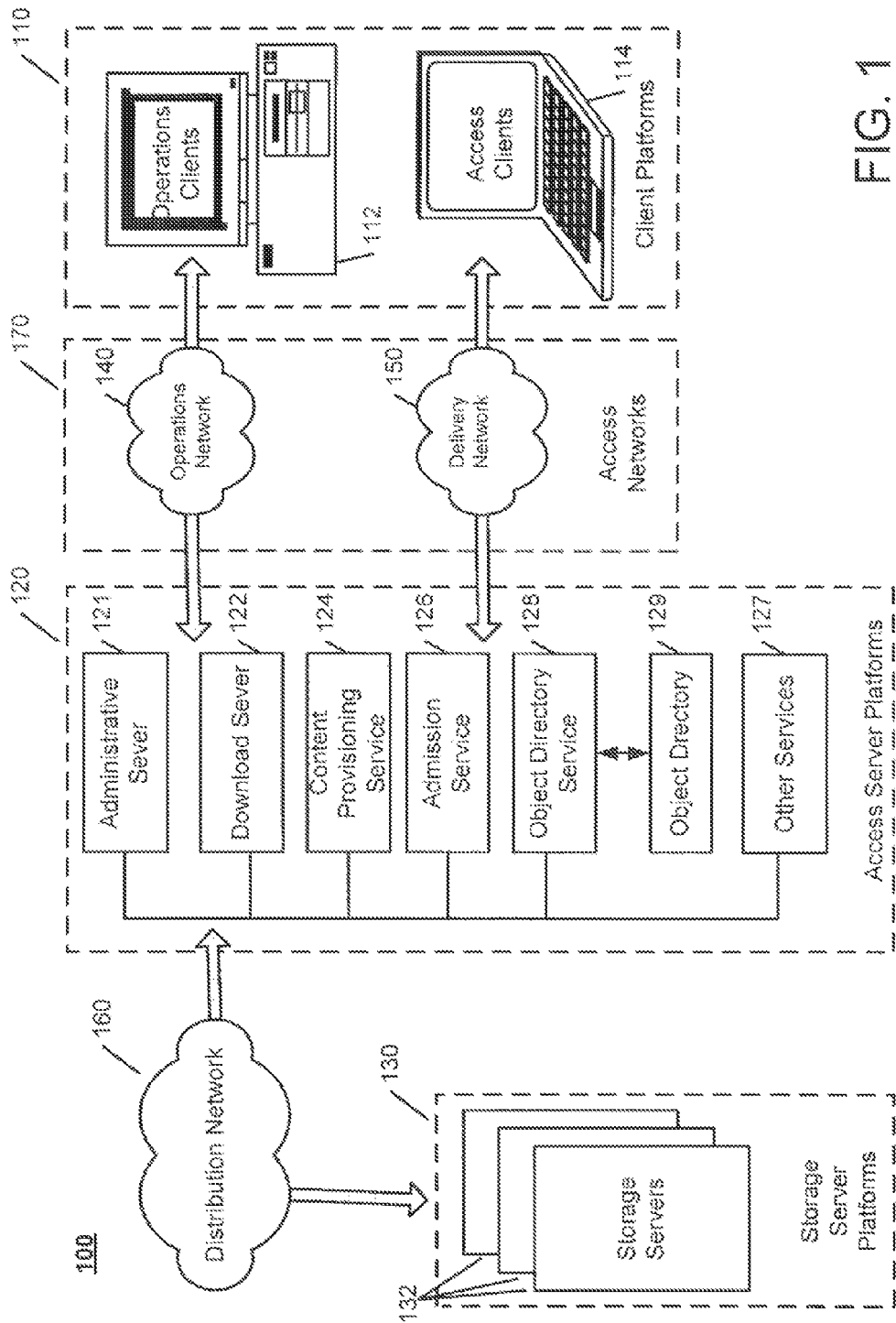
FIG. 1 is a block diagram of an exemplary distributed system for data storage and access.

Referring to FIG. 1, briefly, a distributed system 100 consists of three basic types of computing platforms for content storage and delivery: storage server platforms 130, access server platforms 120, and client platforms 110. The term "platform" is used to refer to a collection of components, which may, for example, be hosted on a single computer, or distributed over multiple computers.

The storage server platforms 130 may host multiple storage servers 132, which contain storage and provide the capability to read and write data. For example, each server may be hosted on one computer, or its function may itself be distributed on multiple hardware elements.

The access server platforms 120 provide access services that collectively provide applications with one or more methods of accessing data/content with respect to storage servers of the system. Some access services handle the data according to a prescribed access protocol/regime/interface (e.g., hypertext transfer protocol (HTTP), real time streaming protocol (RTSP), network file system (NFS), etc). Other access services manage the resources of the system and regulate access to content accordingly. Services that manage resources of the system include for example, a content provisioning service 124, which allocates resources of the system to store and deliver content, and an admission service 126, which admits sessions when called upon by various session requests in the system.

In general, the access server platforms 120 are interconnected on one side with the storage server platforms 130 by a distribution network 160, and on the other side with the client platforms 110 by an access network 170. The access network 170 allows various types of clients to communicate with the access server platforms 120 via one or multiple channels. For example, operations client 112 (e.g., administrators of online video stores) may communicate with an administrative server 121 via an operations network 140, while access clients 114 (e.g., customers of online video stores) may communicate with a download server 122 via a delivery network 150. Both administrative and download servers 121 and 122 may interact with the rest of the system to handle various client requests such as uploading and downloading content.

In uploading content to the storage, the content provisioning service 124 determines a good way of arranging data across available storage resources that can satisfy operational objectives of the content. Examples of operational objectives include performance objectives (such as accessibility), integrity, resilience, and power consumption, each of which can be characterized by one or multiple attributes. For instance, a popularity attribute associated with a viewing frequency of a particular title can represent a desired level of content accessibility—one type of operational objective that the system may intend to serve.

The process of making good provisioning decisions that take into account the objectives of each individual in the system can represent a nondeterministic polynomial time (NP) Complete problem, which is particularly complex for large systems. One approach to solving this problem involves applying domain knowledge to organize the problem space and to form partial solutions (e.g., models) that can guide the search for optimal solutions in a more efficient manner. For example, a pattern of access to titles of a library can be used to establish a model workload that contains a finite set of categories that are each mapped to a partially determined allocation scheme that represents a way of resource arrangement. Using the model, content provisioning can be then approached as a two-step process—firstly, attribution of each piece of content to a proper category, and secondly, resource allocation within the local scheme of that category. Model-based content provisioning will be described in greater detail in the following sections.

2 Model-Based Content Provisioning

Figure 2:
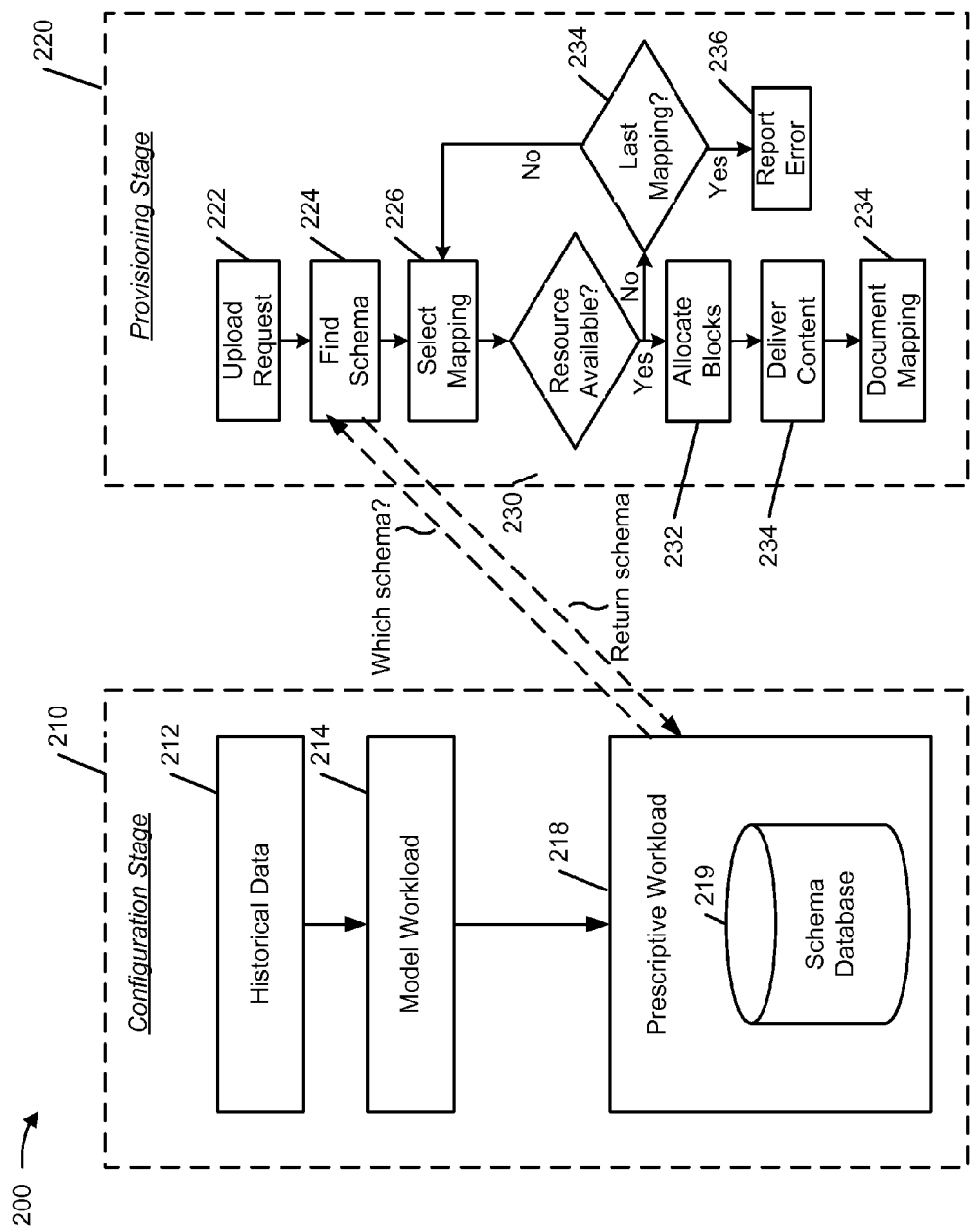
FIG. 2 is a flow chart illustrating the operation of model-based content provisioning.

Referring to FIG. 2, in one implementation of a model-based approach for content provisioning, the content provisioning service makes use of model-based partial solutions, which are obtained during a configuration stage 210, to pre-compute information that is later used during a provisioning stage 220 for determining a good arrangement of content on the storage resources of the system.

At the configuration stage 210, for example, empirical data 212 are used to generate a model workload 214 that represents a type of workload the system aims to support. Empirical data can range from a verbal description of the overall usage of video, through a detailed weblog of all events from a running system including video viewing events. One example of empirical data 212 is a statistical usage distribution provided by video store operators, characterizing the number of views per each title of a library over a 24-hour service window. Another example is a geographic profile of viewing habits among consumers across a wide range of areas. In situations where empirical data is unavailable or insufficient, other information such as customer projections of content usage and service objectives can also be used for creating the model workload 214.

The model workload 214 can be manually generated prior to being introduced to the system, or automated (e.g., in a heuristic way) by the system itself. Based on the model workload 214, a prescriptive workload 218 is created. Very generally, the prescriptive workload 218 offers partial solutions to the problem of resource allocation by partitioning the problem space in a discrete way. A prescriptive workload 218 can be generated for example, by mapping the model workload 214 onto a particular system configuration—either 1) the system size is fixed and the workload is scaled to fit the system; 2) the workload is fixed and the system size is scaled to match the workload; or 3) a combination or both. In some applications where content attributes are provided as a characterization of operational objectives, the prescriptive workload 218 can be viewed as a partitioning of attribute space, defining a set of attribute-based categories (referred to herein as schemas) in which each individual can be mapped to a type of resource arrangement associated with that category. Several approaches to creating the prescriptive workload 218 will be described in greater detail later.

The prescriptive workload 218 can be represented in the system as a collection of configuration data (i.e., schema database 219) that describe how to provision and access objects in the system. The schema database 219 includes schemas and provision tables, which together provide a description of a definition of each schema and the resource arrangement associated with that schema. Take popularity-based content provisioning for example. One schema can be defined to include titles in the top 5% of the most frequently viewed in the library. For a system that aims to provide a maximum of 800 Mbps bandwidth for each title in this category with an aggregate limit of 800 Mbps or more for all titles in the category, the schema database 219 describes the set of arrangement combinations that can support such a bandwidth goal, including for example, distributing content data across a span of eight disks. These types of information are later used during content provisioning to help the content provisioning service 124 to determine a good way of allocating resources that addresses the operational objective(s) (here, accessibility) of the content.

In addition to providing the desired accessibility of the content, the prescriptive workload 218 and associated schemas are also designed to reduce a degree of inter-title contention in the system. Examples of a prescriptive workload that creates a high level of inter-title contention include storing four copies each of "Shrek I" and "Shrek II" on one single server that has a maximum readout rate of 100 Mbps. When "Shrek I" is at peak usage (e.g., streamed at 90 Mbps) that occupies most or all of the server's access capacity, the remaining data on this server (including "Shrek II") are rendered inaccessible, while resources of other servers in the system may be left idle. In comparison, a less contentious prescriptive workload, for example, stores one copy of "Shrek I" and "Shrek II" per server across four different servers, so that the peak usage of one object does not exceed 25% of a server's output capacity, without blocking access to other data on these servers.

During the provisioning stage 220, content provisioning service 124 makes use of information in the schema database 219 to provision content in the following way. Upon receiving a request 222 for uploading a piece of content, the content provisioning service first determines a proper schema for this content, by matching content attribute(s) against the partitioning results in the schema database (step 224). If, for example, this content ranks among the top 5% popular titles, the exemplary schema described above is selected. Accordingly, content data will be stripped across eight disks. Given this eight-disk requirement, there still exists multiple ways of mapping content to the storage. For a system consisting of 16 disks of storage, one option is to map content to disks number 1 through number 8, and a second option is to use disk number 9 through number 16 (and possibly other eight-disk combinations).

Among various mappings, content provisioning service 124 selects a best mapping, for example, the one with the lowest server occupancy (step 226). If there are sufficient resources available in this best mapping (step 228), content provisioning service 124 proceeds to allocate a set of physical blocks on each of the eight disk drives according to the best mapping (step 230) and subsequently, the administrative server 121 delivers the content data to these locations (step 232). If content provisioning service 124 fails to locate sufficient resources in the best mapping, it selects the next mapping to repeat the evaluation process 228 until an available mapping has been found and committed. In some situations when multiple copies of a piece of content are desired on the system, the content provisioning service may determine for each individual copy a best available mapping and store data accordingly. After data delivery completes, results of the mapping (including the disk locations of the data) are documented in the object directory 129, so that content can be conveniently accessed in the future by other services (e.g., admission service 126)

Usually, when the system is operating normally, there is space available for new content as long as the resources used by an aggregate of titles are within designed limits. In rare occasions, if none of the mappings are deemed available after an exhaustive search (e.g., due to system overbooking), an error 236 is reported. Errors can be handled by operator intervention, or alternatively by the system itself via other services (e.g., management service).

3 Creating Models

By partitioning the problem space and formulating partial solutions, model and prescriptive workloads can help content provisioning service 124 to manage resources across multiple dimensions in a more efficient manner. There are various approaches to creating good models. One approach, for example, is to perform k-ary subdivision in n-space, where k is a subdivision factor (e.g., k=2 is binary subdivision) and n is the number of independent attributes. Here, an attribute can be a characterization of one of operational objectives (such as popularity, resilience, and integrity), independent resource pools and their characteristics (such arrays of disks and the disks' model(s)), and/or other aspects in resource management.

Referring to FIG. 3, very generally, some applications of attributed-based modeling proceed as follows.

STEP 1: Obtain empirical usage distribution that represents a pattern of access of titles in a library. Usage distribution can be a description of access rate (e.g., views per second, average number of concurrent views, Megabits per second) as a function of one or multiple attributes (e.g., title rank) Such information can be obtained either from actual usage data (e.g., store records from Netflix®, Blockbuster®, Hollywood Video®, etc.), or based on projections (e.g., using video rental data to extrapolate their usage characteristics). In some applications, a continuous mathematical model is formulated to describe usage data.

STEP 2: Partition the attribute space based on usage distribution. Here, a set of schemas are defined, each being associated with ranges of one or multiple attributes (e.g., top 5 percentile of title rank). A schema generally describes how a title with a given set of attributes is assigned resources in the system. Each schema is mapped to a pattern of storage allocation, including for example, a combination of disks on which titles in this schema will be located and the number of copies that will be stored for each title.

STEP 3: Compute resource utilization (e.g., total amount of storage) by integrating resource requirements of each title of the library based on the partitioning result. In some applications, the aggregate resource requirements serve as a basis for determining the number and types of storage servers that will be used in the system.

These three steps can be performed manually or automated in an iterative way to optimize one or multiple objective functions (e.g., cost, resource utilization, inter-title contention, power consumption), and further, by taking into consideration a set of constraints. For example, in situations where utility cost needs to be minimized, after the assignment of initial partitioning parameters, steps 2 and 3 can be iteratively performed to determine a good (or best) way of partitioning that yields the least amount of utility cost while satisfying certain constraints that limits some aspects of provisioning (e.g., the total amount of storage and maximum readout rate per disk). If the process at a particular step is not converging effectively, the previous step can be reentered and modified.

To further illustrate attribute-based modeling, two examples are described in greater detail below.

3.1 Example I

Modeling with Single Attribute

Figure 4B:
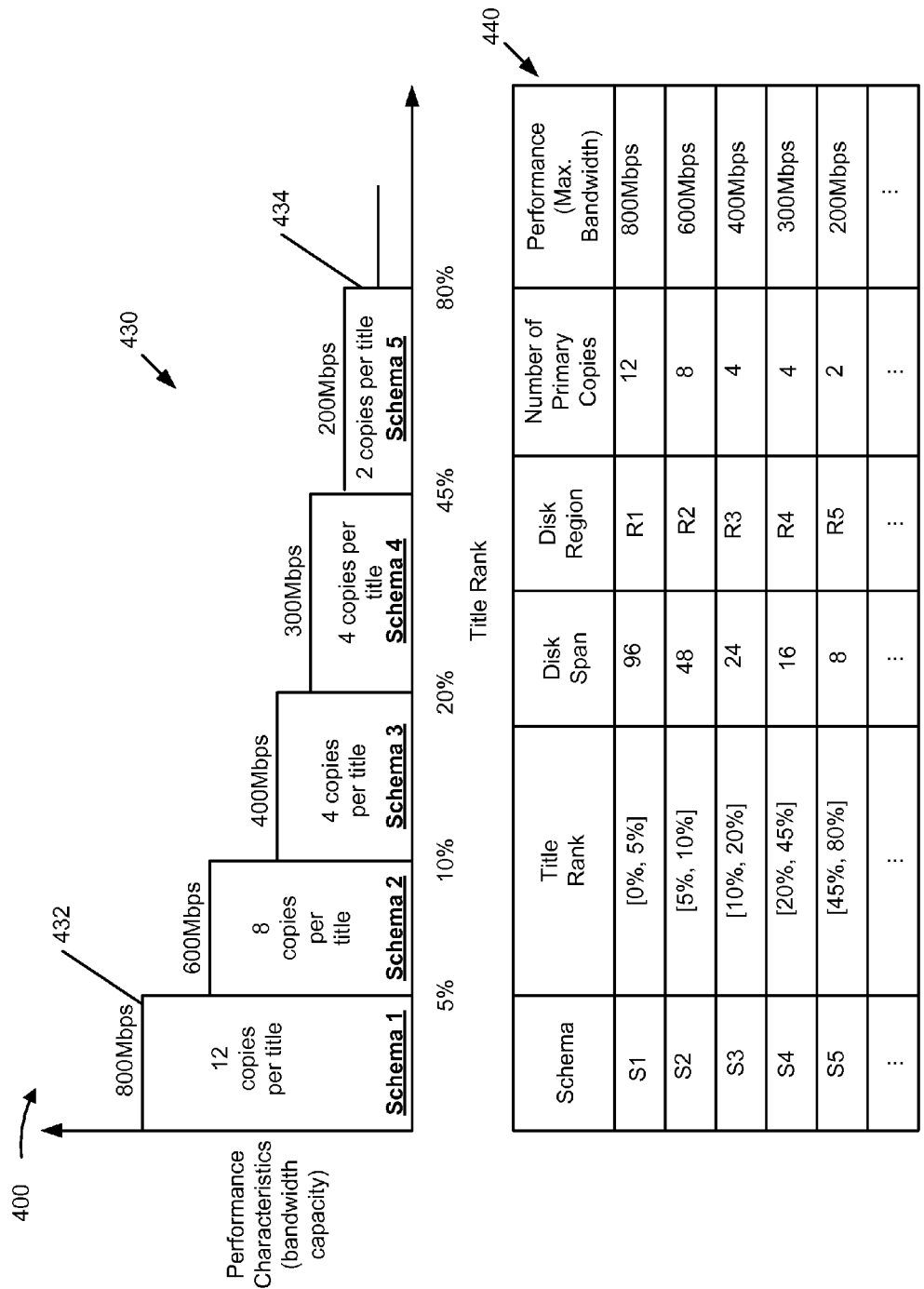

Referring to FIGS. 4A and 4B, in the first example, models for content provisioning are created based on a single attribute—popularity. Here, popularity is an expression of anticipated demand for a piece of content. For example, if content is popular, demand for it will likely be high, and thus the provisioning system will attempt to provision the content with the resources necessary to meet the expected demand.

Graph 410 is a distribution of the access rate (e.g., views per day) of 1 million titles in a user generated video library plotted against popularity rank on a log-log scale. As shown in the graph, access rate (and therefore the demand for access bandwidth) varies widely from title to title. While some of the most popular titles are viewed more than a million counts per day, titles in the lowest rank are accessed no more than once per day. Generating a popularity-based model workload can thus allow system resources to be allocated in ways that are consistent with service objectives (such as title accessibility).

One way of creating a model workload that takes popularity into account is shown in graph 420. A set of quanta are created as a result of sub-dividing the continuous usage distribution curve 410. Each quantum is associated with a range of title rank within which all titles will share a partially determined allocation schema. This model workload provides a framework that later guides the process of content provisioning, e.g., by concentrating more system resources on individuals that have a greater demand. Note that, in producing the model workload, a full variety of quantization schemes (e.g., binary subdivision or ternary subdivision or even non-uniform and non-formulaic subdivisions) can be used. Different quantization schemes may have advantages or disadvantages with respect to different sets of empirical data, specific applications (e.g., providing content in distinct data categories such as movies or online ads), or system configuration that will be used to support the workload.

FIG. 4B illustrates one set of schemas that are applicable in this example. As shown in graph 430, each quantum that spans over a given range along the axis of title rank corresponds to a specific schema. Titles in the same schema share a set of pre-determined arrangements and service characteristics, including for example, the number of disks and disk region where each title will be stored, the number of primary copies of each title, and performance characteristics such as the maximum access bandwidth the system is able to offer, as illustrated in provision table 440. For instance, a title that falls within the top 5 percentile will be provisioned according to Schema 1 (S1)—that is, having 12 copies on the storage with each copy stripped on disk region 1 (R1) across a span of 96 disks. Such an arrangement provides a maximum of 800 Mbps access bandwidth.

Based on the schemas, the amount of storage capacity needed for the entire library can be computed and used for determining hardware requirements for the system. For example, if the amount of storage needed for 1M titles is approximately 90 TB according to the prescriptive workload, the system can be configured to include 96 1 TB disks organized as 4 servers each with 24 disk drives. Further, if it is desired to provide an access bandwidth of 36 Gbps for servicing 40K simultaneous sessions (each session encoded at 900 Kbs) on the system, each disk drive is selected to have at least a sustained readout rate of 400 Mbps.

3.2 Example II

Modeling with Multiple Attributes

Figure 5:
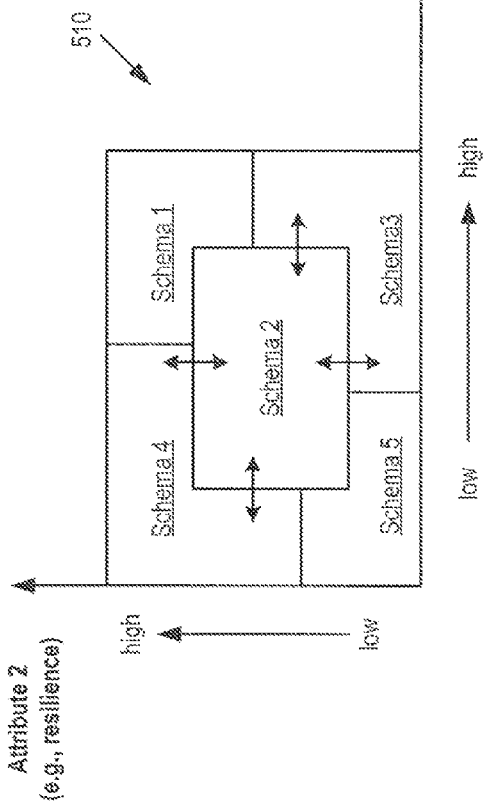
FIG. 5 illustrates another example of modeling using multiple attributes.

Referring to FIG. 5, in the second example, two set of attributes (e.g., popularity and resilience) are both used in creating a model workload. In this description, resilience relates to a predicted level of service maintained to an information object in the presence of component failure. For example, in accessing a resilient object, a customer encountering a failed read on disk A can continue to be serviced through reading an alternative copy of data on disk B. Generally, the more resilient an object needs to be, the more resources (and possibly the more types of resources) the content provisioning system needs to allocate to that object.

Graph 510 illustrates an exemplary subdivision of a two-dimensional attribute space. In contrast with the single-attribute modeling, each schema is now defined by combinations of ranges of each of the two attributes. Again, tittles in each schema are assigned with a set of pre-determined arrangements and service characteristics. For example, titles in Schema 1 correspond to both high resilience and high popularity, and are therefore each stored with 4 primary copies in the fast region (R1) of 12 disks to provide good resilience and accessibility. In comparison, titles in Schema 5 correspond to both low popularity and low resilience, and are therefore each stored with only one primary copy in the slow region (R5) of 4 disks. Each schema can be defined by specified ranges of attribute values. For example, Schema 2 is defined by popularity attribute value in the range of $[A^1_{S2\_min}, A^1_{S2\_max}]$ and resilience attribute value in the range of $[A^2_{S2\_min}, A^2_{S2\_max}]$ This schema provides that each of the three primary copies of the title will be written in R2 across a span of 8 disks. This arrangement gives rise to a 600 Mbps access capacity supportable by the system for each title in S2.

In some applications where more than two attributes are used for generating model workload, subdivision of multi-dimensional attribute space can be performed using a similar approach. For example, each schema will be defined by combinations of value ranges of each one of these attributes. Once a title is allocated to a proper schema based on its attribute values, content provisioning is performed according to the pre-determined arrangements assigned to this specific schema.

Another example of attributes that can be used for generating model workload is integrity. In this description, content integrity relates to the ability to recover content after a component failure, even a catastrophic failure of the system. For example, if a disk fails completely and is unrecoverable, the portions of content contained on the disk can be recovered from an alternate copy of the content within the system or across systems and/or from an encoded reconstruction method.

Other examples of attributes include geographical affinity and exclusion, topological affinity and exclusion, and power consumption.

3.3 Other Examples

In some examples, manual or automated optimization can be incorporated in modeling to achieve one or multiple design objectives. One design objective can be, for example, to make best use of available resources, given that the number and types of storage servers have been determined prior to modeling. Another design objective can be to minimize the overall system resource requirements while satisfying the service goals of individual or an aggregate of titles, if hardware components of the system are yet to be determined.

To perform optimization, generally, an objective function is first defined and the inputs that can minimize or maximize its value are determined. (Sometimes, a group of constrains are imposed on the values that the inputs can take.) In the example described in FIG. 5, the definitions of schemas can be viewed as inputs to an objective function of utility cost that needs to be minimized. Beginning with an initial set of inputs (e.g., the current boundary conditions of the schemas in the figure), an optimized set of schema definitions may be found by making small steps of adjustments in the inputs (such as moving the boundaries of Schema 2 along each attribute axis) to arrive at conditions that yield the lowest system cost. (See Re-Modeling below for adjusting model and schemas to optimize a running system.)

In some systems, one advantage of using a model-based approach to manage resource allocation is that the performance and behavior of components and subsystems can be tested prior to building the entire system. The model can be refined to the subsystem or component level, and tests can be devised for the subsystem or component prior to incorporating it into the overall system. For example, multilayer test scripts can be used to test and qualify subsystems on various levels (e.g., an individual disk drive, a group of disk drives, and a complete storage server) and ultimately be extended to the entire system (which includes access servers, storage servers, disk scheduler, and etc). The test results are analyzed and used to determine a desirable system configuration or modification. These results may also provide a verifiable performance objective for the next level of system development.

4 Content Re-Provisioning

Once content has been successfully provisioned to the system and been made available for access, the actual usage of the content may be tracked by collecting content statistics (such as session counts and bandwidth consumption) from storage and access servers. The actual usage of an object may deviate from its level of provisioning, and large deviations can affect overall efficiency of resource utilization. For example, over-provisioned objects may be consuming resources that are not put in active use yet nonetheless are prevented from being allocated for other objects, whereas in the mean time, under-provision objects are assigned insufficient resources resulting in incoming access requests being rejected. Therefore, in order to enable the system to continue to operate in a globally optimal state, a content re-provisioning service is provided.

There are many situations in which content re-provisioning may be desired. A first situation occurs when a title is initially provisioned without attributes (e.g., placed in a default schema and provisioned accordingly), the actual usage of that tile is later used to determine which schema is appropriate to use and whether the title needs to be re-provisioned. A second situation occurs when a title is initially provisioned using attributes that are not representative of the actual usage (e.g., when marketing promotion boosts a movie's near term popularity), the system detects the discrepancy ("anomaly") between the actual and provisioned levels and orders the title to be re-provisioned by selecting a schema most reflective of the title's actual usage. A third situation of content-repositioning occurs when there is a planned lifecycle management of attributes (e.g., "aging"), and titles are scheduled to be moved between schemas on a pre-determined basis, for example, providing progressively less bandwidth for a title over the lifetime of its release cycle.

In each one of these situations, the content re-provisioning service provides at least two types of operations: 1) up-provisioning, which upgrades provisioning to a higher-level schema that will generally assign more resources to the content; and 2) down-provisioning, which downgrades provisioning to a lower-level schema to release some amounts of resources back to the system. These operations are described in greater detail in the context of anomaly-based and threshold-based content re-provisioning.

4.1 Anomaly-Based and Threshold-Based Re-Provisioning

Generally, anomaly-based and threshold-based content re-provisioning deals (1) with content that has been provisioned using attributes that are not representative of its actual usage or (2) with content whose usage has unpredictably changed such that the provisioning is no longer representative of and appropriate for its actual usage. In addition to being a result of incorrect schema assignment (e.g., due to inaccurate data and/or default schema assignment), "anomaly" can be caused by many other factors, including for example, certain marketing initiatives and unpredictable events (such as the death of an actor) that results in a change in content's near term popularity. When anomaly is detected, or the usage of a piece of content crosses a threshold that indicates that the content is over or under provisioned, then that piece of content will automatically be re-provisioned.

One example of anomaly-based re-provisioning is described in detail below.

Figure 6:
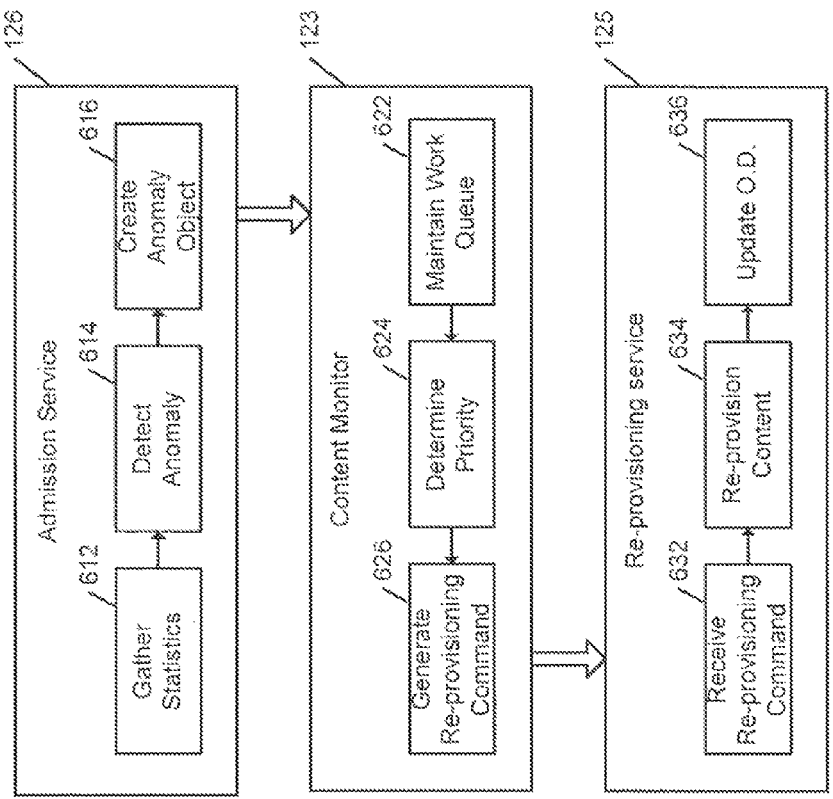
FIG. 6 is a diagram illustrating an exemplary approach of anomaly-based content re-provisioning.

Referring to FIG. 6, the content re-provisioning service 125 interacts with other services in the system, including the admission service 126 and content monitor 123, to provide the following functionalities.

The admission service 126 gathers and maintains a set of running statistics for each piece of content that is currently being accessed (step 612). Examples of running statistics include the number of admitted concurrent sessions for each object and the total usage across all objects at any given time and over time. The admission service 126 also maintains provisioning anomaly threshold on a per schema basis as part of a service configuration file (step 614). When the actual usage of a title (e.g., an instant access rate) has crossed the anomaly threshold for its corresponding schema (including, for example, exceeds a predetermined threshold for up-provisioning, or falls below a predetermined threshold for down-provisioning), which indicates an unexpected transient usage, a provisioning anomaly object is created (step 616) and provided to the content monitor 123.

The content monitor 123 maintains a work queue (step 622) of provisioning anomaly objects submitted by the admission service 126, and determines and preferably prioritizes a list of outstanding re-provisions (step 624). For example, based on the type of each provisioning anomaly, the content monitor 123 determines whether the anomaly can be remedied by reprovisioning. For content that requires up-provisioning, but is already at the top level of provisioning, a "Provisioning Anomaly Not Repaired" event will be sent and no further processing is required for that content. In some examples, the content monitor 123 places content to be up-provisioned at higher priority in order for the system to be able to admit as many future service requests related to the content as possible. In some other examples when resources for up-provisioning are not immediately available, requests to down-provision content are honored prior to requests to up-provision in order to free up system resources for up-provisioning. For each item on the list of outstanding re-provisions, the content monitor 123 determines a set of new attributes that are representative of its actual usage and subsequently generates a re-provisioning command (step 626) to instruct the re-provisioning service 125 to re-provision the item accordingly.

After content re-provisioning service 125 receives the re-provisioning command (step 632), content is re-provisioned based on the new attributes (step 634). Similar to a general content provisioning procedure described earlier, the re-provisioning service 125 selects a schema corresponding to the new attributes, and assigns resources to write new copies of the content on the storage according to the schema. When content has been given its new provisioning, the re-provisioning service 125 updates content information in the object directory (step 636) and removes old instances of content data from the storage.

In addition to anomaly-based re-provisioning, another type of re-provisioning uses a threshold mechanism to make re-provisioning decisions by taking into account short-term and/or long-term variability (e.g., a viewing trend) of title usage. One example of threshold-based re-provisioning is described below.

Once a title has been stored on the system and made available for access to customers, the usage (or popularity) of this title will naturally change. A new title (e.g., movie, TV episode, news segment) often experiences high usage when first introduced; over time, usage typically decreases, although usage of different titles may decrease at different rates. In some cases, a new title (e.g., a user generated video) will experience very little usage when first introduced, and remain at little or no usage over its entire lifetime; however, social buzz may bring attention to some of these titles resulting in an increase in usage. As the attention wanes, usage decreases.

In this example of threshold-based re-provisioning, a trend of usage of a title is monitored, for example, by computing the first derivative of the title's viewing rates with respect to time). This trend is then measured against a threshold to determine whether the usage of the title follows a projected trend of this title. This projected trend can be configured on a per schema basis (i.e., every title in the same schema is associated with a same/similar projected trend), or alternatively, configured specifically for each title based on its own characteristics (e.g., depending on attributes such as the type and content of titles). If the actual trend of usage of a title substantially deviates from the projected trend (e.g., the title is experiencing a usage increase during the past week as opposed to a projected slow decay), the title will be placed in a re-provisioning list to be re-provisioned. In many cases, re-provisioning actions initiated by threshold-based re-provisioning decisions are conducted by the system at convenient time (e.g., during times of light service load) to reduce disturbance to other operations of the system.

There are several algorithms that can be used in this example of threshold-based re-provisioning. A first implementation is based on a non-weighted backwards looking time window and usage threshold. By discrete sampling of continuous time events, usage distribution of a title is estimated and compared with threshold to determine whether re-provisioning actions need to take place. A second implementation is based on a time-sensitive weighted moving average/sum of usage of a title. More specifically, in recognizing that empirical usage events inherently exhibit a statistical probability that fit a distribution function, a distribution function is used to weight the trailing moving average/sum. This second implementation can reduce sampling errors and aliasing that may occur in a non-weighted implementation, and improve overall system efficiency.

4.2 Schedule-Based Re-Provisioning

In some examples, schedule-based content re-provisioning is performed as a result of lifecycle management, for example, a title that is expected to receive decreasing usage over time can be provided progressively less bandwidth over time in a planned manner. Generally, schedule-based re-provisioning process runs in the background at low priority to keep its impacts on other operations at minimum. One example of schedule-based content re-provisioning proceeds as follows.

Figure 7:
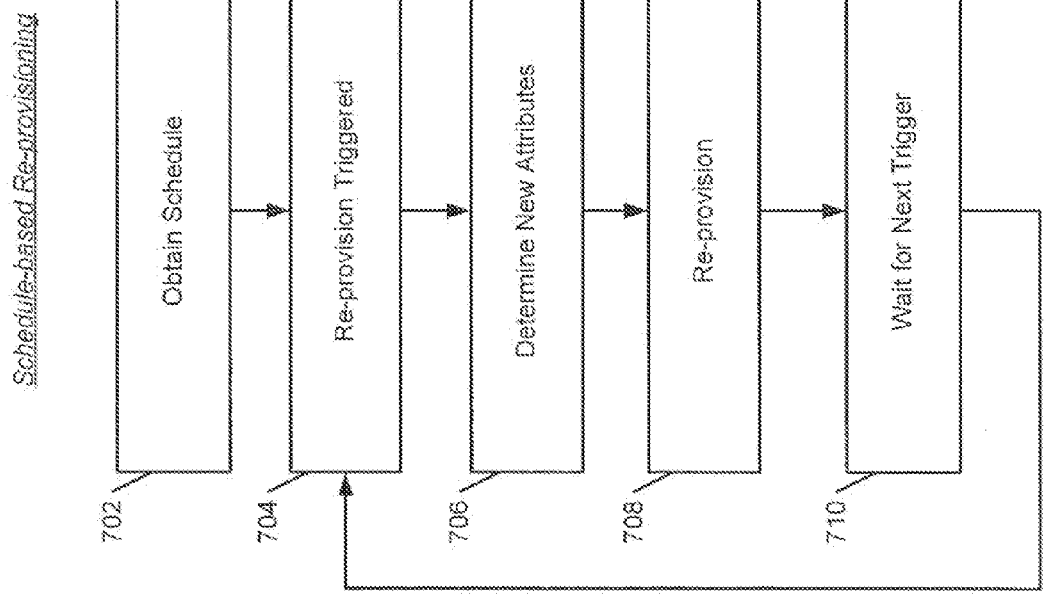
FIG. 7 is a flow chart illustrating an exemplary implementation of schedule-based content re-provisioning.

Referring to FIG. 7, initially, re-provisioning schedules are associated with the titles in the system (step 702). A re-provisioning schedule can be determined manually (e.g., planned by operators based on domain knowledge), or automated (e.g., using a content aging function modeled by gathering content statistics and analyzing a trend of access pattern). The schedule may contain a beginning reference point for the lifecycle and a series of planned re-provisioning actions to be taken (e.g. re-provision a title from its current schema to another specified schema or make a specified change in the title's attributes) and when to take these actions (including, for example, a set of clock time that triggers the actions). Once established, the re-provisioning schedule can be later revised based on the object's actual usage over time and overall system objectives.

When a re-provisioning action is triggered, for example, by a clock time or other triggering events (step 704), a title's new attributes are computed based on the schedule (step 706). The title is then re-provisioned using these new attributes (step 708). After this re-provisioning action completes, the re-provisioning service waits for the next start point to begin another round of re-provisioning actions (step 710).

In some embodiments, the re-provisioning schedules are configured on a contractual base. For example, a schedule includes the start dates/time for a set of re-provisioning actions, and the specifics of the actions to be taken at the time (e.g., a specified provisioning level of the title in each action).

In some other embodiments, the re-provisioning schedules further include a set of usage models configured for re-provisioning purposes, where each usage model corresponds to a particular set of re-provisioning actions. During system operation, the actual usage of a title is measured against the set of usage models to determine the best-matching usage model. The re-provisioning service then re-provisions the title according to the actions corresponding to the best-matching model. At the next trigger when the title is scheduled to be re-provisioned again, if the actual usage of the title is faithful to the usage described in the previously-identified best-matching model, the title will be re-provisioned, again, according to the actions corresponding to this model. If however, the actual usage deviates significantly from what is described in the previously-identified best-matching model, a new best-matching model is selected for the title. Subsequently, the title is re-provisioned according to the set of actions corresponding to this new model.

Generally, the services involved in content re-provisioning, such as content re-provisioning service 125 and content monitor 123 can be provided by one or multiple physical servers. These servers may be one or more access server platforms 120 (as shown in FIG. 1), or one or more external re-provisioning platforms, or a combination of both.

5 Re-Modeling

As described earlier, when actual usage of an individual piece of content appears to be inconsistent with the schema to which the content has been provisioned, the content re-provisioning service is used to re-assign the content to an appropriate schema that can more accurately represent the actual usage. However, in some situations, if such inconsistency occurs on a broader scale, a significant number of re-provisioning requests may occur in the system or the re-provisioning requests can be satisfied, which can cause re-provisioning storms that can unbalance the system and threaten its performance and stability. In addition, when a large portion of the actual workload is performing at levels that deviate from prescribed levels, the prescriptive workload itself may no longer be appropriate for the system achieving desired performances and behavior. Moreover, there are certain system updates (e.g. loss of a failed server or addition of new servers to the system) that will affect the amount of available resources that can be allocated and thus the way content should be provisioned. In those cases, system reconfiguration and/or remodeling on a global scale is recommended. In some embodiments, the system's actual usage is now used as new empirical data (a new 212) to create a new model workload, a new prescriptive workload, new schemas, etc.; these may represent a minor or major change to the system, depending on the extent of differences between previous and new empirical data and system objectives.

Referring to FIGS. 8A and 8B, in one example, when a large discrepancy is detected between an actual workload 830 of the system and the prescriptive workload 810 that is currently in use for content provisioning, re-modeling is performed to configure a new prescribed workload 820 (including schemas and provision tables) that better match the actual workload 830. As shown in the actual workload 830, titles that are assigned in the first two quanta are under-provisioned because their access rates on average are substantially higher than prescribed levels (i.e., 800 Mbps and 600 Mbps, respectively). By contrast, titles in the remaining quanta are over-provisioned with bandwidth capacities that are not fully consumed during system operation. As a result, the maximum total system performance can be much lower than that was previously designed.

One way to recover such a loss is to rebalance the relative allocation of resources among schemas, as illustrated in the new prescriptive workload 820. Here, the access bandwidth for titles in the first two quanta is raised to 950 Mbps and 800 Mbps, respectively, whereas the rest of the library has been decreased to lower levels accordingly. A new set of schemas (S1', S2', S3', S4', and etc) now replaces the previous set (S1, S2, S3, S4, and etc) to reflect the changes in resource allocation.

Note that in the example described above, a pattern of resource allocation associated with each schema (e.g., disk span and disk region) is affected, but the boundaries of schemas (i.e., the definition of schemas based on divisions of attribute space) remains unchanged. Though, this need not be the case. There are many different ways to create new prescriptive workloads in re-modeling. One alternative way, for example, involves a change in the partitioning of attribute space (e.g., by modifying boundaries of schemas and/or the total number of schemas) and/or the pattern of resource allocation that is mapped to each of the schemas.

Once a new prescriptive workload has been configured, future upload requests will be handled by the content provisioning service according to the new schemas. Previously-provisioned content, on the other hand, can be gradually re-provisioned and migrate into new locations to bring the system back toward optimality. The old and new prescriptive workloads may coexist in the system during this period to facilitate this migration.

Another example of re-modeling occurs with the addition of new resources, e.g., servers, to the system. If the above examples represent a system of 4 storage servers and 4 access servers, expanding the system to, for example, 6 storage servers and 6 access servers can result in a 50% increase in system resources to be allocated. (Here, the number of storage and access servers need not be the same.) Depending on expected new system usage, at least three changes to the prescriptive workload can be made. (1) If the system is being increased because the systems is becoming filled with more lower-popularity titles, then one or more lower-popularity schemas can be added. (2) If overall system usage is increasing and the proportion of usage across titles is as before, then all schemas are proportionally provided more system resources. (3) If the system is being increased because more higher-popularity titles are being added, then one or more higher-popularity schemas can be added. Note that these three scenarios are not exhaustive.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
    estimating, by the computer, a first access pattern associated with an item;
    identifying, by the computer, a first set of attributes based on the first access pattern;
    storing, by the computer, information associated with a plan for managing storage resource allocation associated with the item,
        the plan including a rule associated with a rule trigger, and
        the item being stored, prior to an occurrence of the rule trigger, using resources of a storage environment according to a first resource allocation arrangement, of a plurality of resource allocation arrangements, that is compatible with the first set of attributes;
    detecting, by the computer, the occurrence of the rule trigger; and
    applying, by the computer and based on the occurrence of the rule trigger, the rule,
    applying the rule including:
        determining a second access pattern associated with the item at the occurrence of the rule trigger,
        when the first access pattern and the second access pattern differ by less than a threshold amount, determining a second set of attributes based on applying a discount factor to at least one of the first set of attributes,
        when the first access pattern and the second access pattern differ by at least the threshold amount, determining the second set of attributes based on the second access pattern,
        selecting a second resource allocation arrangement, of the plurality of resource allocation arrangements, that is compatible with the second set of attributes, and
        causing the resources of the storage environment to store the item, after the occurrence of the rule trigger, using the second resource allocation arrangement.

2. The computer-implemented method of claim 1, further comprising:
    determining the plurality of resource allocation arrangements based on the first access pattern, and
    storing the plurality of resource allocation arrangements.

3. The computer-implemented method of claim 1, where determining the second set of attributes based on the second access pattern includes:
    determining a third set of attributes related to the second access pattern, and
    applying the discount factor to at least one of the third set of attributes to form the second set of attributes.

4. The computer-implemented method of claim 1, where the rule further includes information identifying a list of candidate resource allocation arrangements, for the item, from the plurality of resource allocation arrangements, and
    where selecting the second resource allocation arrangement includes:
        sequentially selecting, as the second resource allocation arrangement, one of the list of candidate resource allocation arrangements.

5. The computer-implemented method of claim 1, where the occurrence of the rule trigger relates to:
    an onset point, and
    an activation window that follows the onset point.

6. The computer-implemented method of claim 5, further comprising:
    determining the onset point and the activation window based on the first access pattern.

7. The computer-implemented method of claim 1, where the occurrence of the rule trigger relates to:
    a sequence of onset points, and
    activation windows that follow, respectively, the sequence of onset points.

8. The computer-implemented method of claim 7, where applying the rule includes:
    applying the rule upon occurrence of one of the sequence of onset points.

9. The computer-implemented method of claim 1, where:
    the item is included in a group of items, and
    applying the rule includes:
        applying the rule to each of the group of items according to a particular order.

10. The computer-implemented method of claim 9, where the rule includes a plurality of components,
    each of the plurality of components being specific to a respective different item of the group of items, and
    where applying the rule includes:
        applying each of the plurality of components to the respective different item of the group of items.

11. The computer-implemented method of claim 9, where the particular order is specified in the plan.

12. The computer-implemented method of claim 1, where the plan further includes a plurality of rules that includes the rule,
    the plurality of rules being associated with, respectively, a plurality of rule triggers.

13. The computer-implemented method of claim 1, further comprising:
    detecting a change in an operating condition of the storage environment; and
    modifying the plan based on the change in the operating condition of the storage environment.

14. The computer-implemented method of claim 13, where the operating condition of the storage environment includes a hardware configuration of at least one of the resources of the storage environment.

15. The computer-implemented method of claim 13, where the change, in the operating condition of the storage environment, includes a failure of one of the resources of the storage environment.

16. A system comprising:
a memory; and
one or more processors to:
determine a first access pattern associated with an item;
identify a first set of attributes based on the first access pattern;
store, in the memory, information associated with a plan for managing storage resource allocation associated with the item,
the plan including a rule associated with a rule trigger, and
the item being stored, prior to an occurrence of the rule trigger, using resources of a storage environment according to a first resource allocation arrangement, of a plurality of resource allocation arrangements, that is compatible with the initial first set of attributes, and
apply, based on detecting an occurrence of the rule trigger, the rule, the one or more processors, when applying the rule, being further to:
determine a second access pattern associated with the item at the occurrence of the rule trigger,
when the first access pattern and the second access pattern differ by less than a threshold amount, determine a second set of attributes based on applying a discount factor to at least one of the first set of attributes,
when the first access pattern and the second access pattern differ by at least the threshold amount, determine the second set of attributes based on the second access pattern,
select a second resource allocation arrangement, of the plurality of resource allocation arrangements, that is compatible with the adjusted second set of attributes, and
cause the resources of the storage environment to store the item, after the occurrence of the rule trigger, using the second resource allocation arrangement.

17. The system of claim 16, where the rule further includes information identifying a list of candidate resource allocation arrangements for the item, and
where the one or more processors, when selecting the second resource allocation arrangement, are further to:
sequentially select, as the second resource allocation arrangement, one of the list of candidate resource allocation arrangements.

18. The system of claim 16, where the occurrence of the rule trigger is related to:
a sequence of onset points, and
activation windows that follow, respectively, the sequence of onset points, and
where the one or more processors are further to:
determine the sequence of onset points and the activation windows based on the first access pattern.

19. The system of claim 16, where:
the item is included in a group of items, and
where the one or more processors, when applying the rule, are further to:
apply the rule to each of the group of items according to a particular order.

20. The system of claim 19, where the rule includes a plurality of components, each component being associated with a respective different item of the group of items, and
where the one or more processors, when applying the rule, are further to:
apply each of the plurality of components to the respective different item of the group of items.

21. The system of claim 16, where the plan further includes a plurality of rules that includes the rule,
the plurality of rules being associated with, respectively, a plurality of rule triggers.

22. The system of claim 16, where the one or more processors are further to:
detect a change in an operating condition of the storage environment, and
modify the plan for managing the storage e resource allocation based on the change in the operating condition of the storage environment,
where the operating condition of the storage environment includes a hardware configuration of at least one of the resources of the storage environment.

23. A memory device to store instructions, the instructions comprising:
one or more instructions that, when executed by a processor, cause the processor to:
estimate a first access pattern associated with an item,
identify a first set of attributes based on the first access pattern,
store information associated with a plan for managing storage resource allocation associated with the item,
the plan including a rule associated with a rule trigger, and
the item being stored, prior to an occurrence of the rule trigger, using resources of a storage environment according to a first resource allocation arrangement, of a plurality of resource allocation arrangements, that is compatible with the first set of attributes, and
apply the rule based on an occurrence of the rule trigger, the one or more instructions, to apply the rule, further including:
one or more instructions to:
determine a second access pattern associated with the item at the occurrence of the rule trigger,
when the first access pattern and the second access pattern differ by less than a threshold amount, determine a second set of attributes based on applying a discount factor to at least one of the first set of attributes,
when the first access pattern and the second access pattern differ by at least the threshold amount, determine the second set of attributes based on the second access pattern,
select a second resource allocation arrangement, of the plurality of resource allocation arrangements, that is compatible with the second set of attributes, and
cause the resources of the storage environment to store the item, after the occurrence of the rule trigger, based on the second resource allocation arrangement.

24. The memory device of claim 23, where the rule further includes information identifying a list of candidate resource allocation arrangements, for the item, from the plurality of resource allocation arrangements, and where the one or more instructions, to select the second resource allocation arrangement, further include:
one or more instructions to sequentially select, as the second resource allocation arrangement, a resource allocation arrangement from of the list of candidate resource allocation arrangements.

25. The memory device of claim 23, where the occurrence of the rule trigger include:
a sequence of onset points, and
activation windows that follow, respectively, the sequence of onset points, and where the instructions further comprise:
one or more instructions to determine the sequence of onset points and the activation windows based on the first access pattern.

26. The memory device of claim 25, where:
the item is included in a group of items, and
where the one or more instructions, to apply the rule, further include:
one or more instructions to apply the rule to each of the group of items according to a particular order.

27. The memory device of claim 26, where the rule includes a plurality of components, each component being specific to a respective different item of the group of items, and
where the one or more instructions, to apply the rule, further include:
one or more instructions to apply each of the plurality of components to the respective different item of the group of items.

28. The memory device of claim 23, where the instructions further comprise:
one or more instructions to:
detect a change in an operating condition of the storage environment, and
modify the plan for managing the storage resource allocation based on the change in the operating condition of the storage environment,
where the operating condition of the storage environment includes a hardware configuration of at least one of the resources of the storage environment.

* * * * *

UNITED STATES PATENT AND TRADEMARK OFFICE
CERTIFICATE OF CORRECTION

PATENT NO. : 8,887,166 B2  
APPLICATION NO. : 12/170732  
DATED : November 11, 2014  
INVENTOR(S) : Branko J. Gerovac et al.

It is certified that error appears in the above-identified patent and that said Letters Patent is hereby corrected as shown below:

In the Claims

Please correct Claim 16 as follows:

Column 17, line 24, after "compatiable with the" delete "initial".

Column 17, line 42, after "compatiable with the" delete "adjusted".

Signed and Sealed this  
Twenty-eighth Day of July, 2015

Michelle K. Lee  
*Director of the United States Patent and Trademark Office*